United States Patent [19]

Mortl

[11] 4,008,092
[45] Feb. 15, 1977

[54] METHOD OF PRODUCING MgO AND $Cr_2O_3$ BASED REFRACTORIES AND THE PRODUCTS THEREOF

[75] Inventor: Gunther Lorenz Mortl, Carinthia, Austria

[73] Assignee: Osterreichisch-Amerikanische Magnesit Aktiengesellschaft, Austria

[22] Filed: May 19, 1976

[21] Appl. No.: 687,886

Related U.S. Application Data

[63] Continuation-in-part of Ser. No. 290,767, Sept. 20, 1972, abandoned.

[52] U.S. Cl. .................................................. 106/59
[51] Int. Cl.² ........................................ C04B 35/42
[58] Field of Search ........................... 106/59, 66

[56] References Cited

UNITED STATES PATENTS

| | | | |
|---|---|---|---|
| 2,068,641 | 1/1937 | Carrie et al. | 106/59 |
| 2,270,220 | 1/1942 | Pitt et al. | 106/59 |
| 3,574,144 | 4/1971 | Yerouchalmi | 106/59 |
| 3,715,223 | 2/1973 | Wright | 106/59 |

*Primary Examiner*—J. Poer
*Attorney, Agent, or Firm*—Everett H. Murray, Jr.

[57] ABSTRACT

A method is provided for the production of magnesium oxide — chromic oxide wherein magnesium chromite of about 3 to 82 weight percent $Cr_2O_3$ is mixed with 0.05 to 4 weight percent of CaO or SrO and sintering the mixture at a temperature above about 1750° C.

5 Claims, No Drawings

METHOD OF PRODUCING MgO AND $Cr_2O_3$ BASED REFRACTORIES AND THE PRODUCTS THEREOF

BACKGROUND OF THE INVENTION

This application is a continuation-in-part of application Ser. No. 290,767, filed Sept. 20, 1972, now abandoned.

The present invention relates to a process for producing refractory products based on MgO and $Cr_2O_3$.

The requirements for refractory linings used in the metallurgical industry have been becoming progressively more stringent with particular regard to the durability of basic refractory linings. For this reason, the refractory industry has been making a constant effort to improve the quality of its products. In the production of magnesia bricks, this has led to the use of starting materials of progressively increased MgO content. Further, it has become specifically desired to keep the $Fe_2O_3$ content as low as possible in order to obtain bricks having a magnesia content which is as high as possible. It has also been attempted to reduce the iron content of chromium containing ores, but this measure alone is only an unsatisfactory, partial solution to the problem of providing ores which, in addition to $Cr_2O_3$, have only a minimum content of other substances.

Chromium containing ore is almost always used as a starting material for highly refractory materials which contain chromium oxide. Due to its deleterious effects, it has been endeavored for a relatively long time to produce these refractories from chromium containing ores which contain as little as possible silica. Because of the increasing shortage of natural, lumpy chromium containing ores having low silica content, it has become advisable to produce low-silica ores by processes in which naturally occurring ores are ground and dressed to reduce the $SiO_2$ content. In spite of these steps, considerable amounts of impurities, such as alumina and silicates, are left in the ore and these have adverse influences on the refractory products made therefrom.

Herefore, it is an object of this invention to provide a process of producing refractory products based on MgO and $Cr_2O_3$ from starting materials which consist virtually only MgO and $Cr_2O_3$. However, additional substances may be added if they are desired for special purposes.

It is known that the corresponding oxides of magnesium chloride or chromium chloride may be produced by thermal dissociation in reactors. Where magnesium chloride and chromium chloride are used simultaneously and in stoichiometric amounts, the cleavage may result in the formation of substantially pure magnesium chromite ($MgCr_2O_4$). If an excess of one of the two chlorides is used, magnesium chromite will be obtained which contains either MgO or $Cr_2O_3$. In this way, magnesium chromite containing either MgO or $Cr_2O_3$ can now be produced on a commercial scale because the required chlorides are available in adequate quantities and at reasonable prices. The magnesium chromite thus produced, however, is a loose material which is of low density and cannot be used, as such, to make refractory products. Therefore the material obtained from the reaction must be first sintered to form a dense material and the sintering is not possible unless certain agents are added to the material. It has now been found that CaO or SrO or substances forming said oxides on firing are most suitable as sintering agents. In accordance therewith, the process according to the present invention includes the production of refractories based on MgO and $Cr_2O_3$ from sintered refractory materials. The refractories produced are synthetic magnesium chromite, or mixtures of magnesium chromite and MgO or $Cr_2O_3$, having a $Cr_2O_3$ content of from 5 to 82%, and from 0.05 to 4% CaO or SrO or an amount of a substance forming an equivalent amount of said oxides on firing, the remainder being magnesia. The magnesium chromite containing refractory is produced by sintering an appropriate mixture of the components at a temperature of at least 1750° C., and preferably above 1800° C. With the stated low $Cr_2O_3$ content of 5%, 0.05% of the sintering agent will generally be sufficient but when higher percentages of $Cr_2O_3$ are contemplated, the sintering agent must be added in larger amounts. However, if the material to be sintered contains 82% $Cr_2O_3$, 3% sintering agent generally will be sufficient. CaO is best added in the form of ground chalk to the loose starting material consisting of magnesium chromite and, if desired, surplus MgO or $Cr_2O_3$. In this way, a particle specific gravity of 3.6 to 3.8 g/cm³ may be obtained. This specific gravity corresponds to a total porosity of 9.5 to 11.9% in the resulting sintered refractory material. Such a porosity is sufficient for practical purposes since the total porosity may range as high as 15%.

In one embodiment of the process according to the invention, the refractory products may be made from the sintered refractory material together with sufficient sintered magnesia that the products contain 28.10 to 67.00 $Cr_2O_3$, at most 3% $Fe_2O_3$, and 3% $Al_2O_3$, preferably at most 1% $Fe_2O_3$ and 1% $Al_2O_3$. The sintered magnesia which is used should contain at least 95% and preferably at least 97% MgO. Preferred is a magnesia rich magnesium chromite consisting essentially of about 11 to 61 weight percent free magnesia and about 89 to 39 weight percent magnesium chromite.

The products obtained according to the invention, particularly the refractory products containing 60 to 82% $Cr_2O_3$, are suitable for lining industrial furnaces at their most highly stressed portions. Particularly good results will be obtained if the products are used as a lining at the so-called hot spots of electric furnaces. These are the side wall portions adjacent the electrodes. Other specific fields of application are linings adjacent to the lances of oxygen-blown open-hearth furnaces, particularly highly stressed portions of vacuum degasification vessels, such as the spout, bottom, inlet and outlet. Also electrode bushings of electric furnaces, and nozzle zones of copper converters are suitable places for the use of the products of the present invention.

The invention will be explained more fully with reference to the following examples. All of the percentages above and those in the examples are percent by weight based on the total MgO and $Cr_2O_3$ weight, unless otherwise noted.

EXAMPLE I

A mixture of magnesium chloride and chromium chloride is dissociated in a fireclay-lined reactor to form magnesium chromite of the composition $MgCr_2O_4$ + MgO. The chromite was compacted to form cylinders without additives and cylinders with increasing amounts of ground chalk ($CaCO_3$). These cylinders were sintered at temperatures of 1750° and 1850° C.

The sintered materials obtained had the particle specific gravities listed in Table I below.

TABLE I

| Admixture | None | Chalk 1% | 2% | 4% |
|---|---|---|---|---|
| Particle specific gravity after firing at 1750° C. | 1.93 | 2.94 | 3.34 | 3.38 |
| Particle specific gravity after firing at 1850° C. | 2.01 | 3.26 | 3.72 | 3.83 |

It is apparent from this table that excellent particle specific gravities will be obtained if a material containing an admixture of 2.0% chalk is sintered at a temperature of 1850° C. Virtually the same results will be obtained if CaO is replaced by corresponding amounts of SrO or other calcium and strontium compounds which form CaO and SrO when fired.

The above sintered materials had the following composition:

TABLE II

| Composition | Admixture of Chalk 1% | 2% | 4% |
|---|---|---|---|
| $SiO_2$ | 0.24 | 0.18 | 0.13 |
| $Fe_2O_3$ | 1.08 | 0.97 | 0.83 |
| $Al_2O_3$ | 1.26 | 1.26 | 1.41 |
| $Cr_2O_3$ | 67.00 | 67.00 | 66.00 |
| CaO | 0.50 | 0.90 | 1.98 |
| MgO | 29.64 | 29.60 | 29.23 |
| Ignition Loss (I.L.) | 0.28 | 0.53 | 0.42 |
| | 11.87 | 11.83 | 11.72 |

MgO not combined as magnesium chromite

In addition to $Cr_2O_3$, MgO and CaO, these sintered materials contained foreign matter derived from the fireclay lining of the reactor in which the magnesium chromite was made.

EXAMPLE II

A sintered material which had been obtained by sintering magnesium chromite containing surplus MgO with an admixture of 2% chalk was used for making bricks without the admixture of other refractory materials. The bricks were made from a composition wherein 67% of the sintered material particles were from 0.3 to 3mm, and 33% of the sintered material particles were below 0.12mm in size.

The two particle size fractions were mixed with 4% of a saturated solution of waste cellulose sulfite liquor, or with 2% of a dried and powdered waste cellulose sulfite liquor and then with water. The resulting mixtures were molded to form bricks, which were then fired at 1850° C. The fired bricks had the following average properties, based on 10 tests:

TABLE III

| | |
|---|---|
| Bulk specific gravity (BSG) | 3.63 g/cm³ |
| Porosity (Ps) | 13.8% |
| Compressive Strength in Bending (CSB) | 62 kp/cm² |
| Cold-Crushing Strength (CCS) | 367 kp/cm² |
| Hot Bending Strength (HBS) at 1260–1750° C. | 79 kp/cm²(constant) |
| Refractoriness under Load (RUL) | |
| ta | above 1700° C. |
| tB | above 1700° C. |
| lowered | 0 |
| Thermal Shock Resistance (TSR) | 12 |
| Bursting | 16% |

The bricks had the following composition:

| | |
|---|---|
| $SiO_2$ | 0.17% |
| $Fe_2O_3$ | 1.05% |
| $Al_2O_3$ | 1.04% |
| $Cr_2O_3$ | 66.30% |
| CaO | 0.95% |
| MgO | 30.24% |
| I.L. | 0.25% |

As in Example 1, the foreign matter contained in these bricks resulted from the fireclay lining used to make the mixture of $MgCr_2O_4$ and MgO from which the sintered material was produced.

The most remarkable property of these bricks is their hot-bending strength, which does not drop in the relatively large temperature range of 1260°–1750° C., but retains a high value of 79 kp/cm² over the whole of the temperature range. For this reason, these bricks are an excellent material for lining industrial furnaces at their most highly stressed points, such as the hot spots of electric furnaces.

EXAMPLE III

The sintered material produced according to the invention may be used for all purposes in refractory engineering instead of natural chrome ore. Depending on the desired use, this material may be used alone, e.g. to make high-grade chromite or chrome-magnesia bricks, or with an addition of sintered magnesia, e.g. to make chrome-magnesia and magnesia-chrome bricks. If the magnesia component which is used consists of a high-purity, low-iron magnesia containing at least 97% and preferably at least 98% of MgO, the resulting basic refractory bricks consist substantially of a two-oxide system and have also very good properties, as will be apparent from the following.

Magnesia-chrome bricks were made from the sintered material of Example 2 together with a sintered magnesia having the following analysis:

| | |
|---|---|
| $SiO_2$ | 1.0% |
| $Fe_2O_3$ | 0.1% |
| $Al_2O_3$ | 0.1% |
| CaO | 1.0% |
| MgO | 97.8% |

The brick mixture had the following particle size composition:

| | |
|---|---|
| 0.3 – 3mm | 40% of the sintered material |
| 0.3 – 3mm | 27% of the sintered material |
| below 0.12mm | 33% of the sintered material |

The mixture, together with 4% of a saturated solution of waste cellulose sulfite liquor was compacted to form bricks, which were fired at 1850° C. On an average of ten tests, they had the following properties and composition:

TABLE IV

| | |
|---|---|
| Bulk Specific Gravity (BSG) | 3.02 g/cm³ |
| Porosity (Ps) | 19.0% |
| Compressive Strength in Bending (CSB) | 28 kp/cm² |
| Cold-Crushing Strength (CCS) | 250 kp/cm² |
| Hot Bending Strength (HBS) | |
| at 1250° C. | 80 kp/cm² |
| at 1480° C. | 42.0 kp/cm² |
| at 1600° C. | 29.0 kp/cm² |
| at 1700° C. | 18.0 kp/cm² |

TABLE IV-continued

| tB | above 1700° C. |
|---|---|
| lowered | 0 |

TABLE V

PRODUCT COMPOSITION

| $SiO_2$ | 0.70% |
|---|---|
| $Fe_2O_3$ | 0.78% |
| $Al_2O_3$ | 0.60% |
| $Cr_2O_3$ | 28.10% |
| CaO | 1.0% |
| MgO | 66.71% |
| I.L. | 0.11% |
| | 61.26% |

MgO not combined as magnesium chromite

These bricks are also highly suitable for lining industrial furnaces at portions which are subjected to high stresses.

The bricks obtained by the process according to the invention have a direct bond. In this connection, the term "direct bond" means that the refractory particles are directly interconnected by a ceramic bond without interposed silicate phases. The individual particles of the composition will be directly interbonded when the bricks are fired at a temperature of at least 1650° C., or better at least 1750° C., and preferably about 1800° to 1850° C. While the compositions in the examples show a CaO content of from 0.50 to 1.98%, the percentage CaO which may be employed may vary from 0.05 to 4.0%, and SrO may be substituted for CaO.

The corresponding percentage of magnesia rich magnesium chromite will accordingly vary from 99.95 to 96.0 percent by weight.

What is claimed:

1. A sintered refractory brick consisting essentially of about 96 to 99.95 weight percent of a magnesia rich synthetic magnesium chromite sinter containing about 0.05 to 4.0 weight per cent of a member selected from the group consisting of calcium oxide and strontium oxide, said magnesia rich magnesium chromite consisting essentially of about 11 to 61 weight percent free magnesia and about 89 to 39 weight percent magnesium chromite, said magnesia rich magnesium chromite sinter having a total porosity of about 9.5 to 11.9 percent and a particle specific gravity of about 3.6 to 3.8 grams per cubic centimeter.

2. A method of manufacturing a refractory brick comprising the steps of:
   a. preparing a synthetic magnesium chromite by the thermal dissociation of a mixture of magnesium and chromium chlorides;
   b. combining said synthetic magnesium chromite with magnesium oxide in an amount sufficient to combine stoichiometrically with any free chromium oxide and to afford a stoichiometric excess of about 11 to 61 weight percent free magnesia, whereby to form a magnesia rich magnesium chromite;
   c. adding to the magnesia rich magnesium chromite a member selected from the group consisting of calcium oxide, strontium oxide, and precursors thereof thermally decomposable thereto at firing temperatures in an amount of 0.05 to 4.0 weight percent, calculated as the oxide;
   d. sintering at a temperature of at least about 1,750° C, to a total porosity of about 9.5 to 11.9 percent and a particle specific gravity of about 3.6 to 3.8 grams per cubic centimeter;
   e. forming the sintered composition into bricks, and
   f. firing said bricks at a temperature of at least about 1,650° C.

3. The method of claim 2 wherein said sintering is at a temperature of at least about 1,800° C.

4. The method of claim 2 wherein said magnesia rich magnesium chromite contains as impurities up to 3 weight percent ferric oxide and up to 3 weight percent alumina.

5. The method of claim 2 wherein said magnesia rich magnesium chromite contains as impurities up to 1 weight percent ferric oxide and up to 1 weight percent alumina.

* * * * *